United States Patent
Jones

[15] 3,693,402
[45] Sept. 26, 1972

[54] VIBRATION DAMPER TEST MACHINE

[72] Inventor: Nelson A. Jones, Peoria, Ill.

[73] Assignee: Caterpillar Tractor Co., Peoria, Ill.

[22] Filed: July 19, 1971

[21] Appl. No.: 163,647

[52] U.S. Cl. ..........................73/11, 73/70.1, 73/99
[51] Int. Cl. ..............................................G01m 7/00
[58] Field of Search.........73/11, 99, 67.2, 67.3, 70.1, 73/71.5

[56] References Cited

UNITED STATES PATENTS

| | | | |
|---|---|---|---|
| 2,384,987 | 9/1945 | Dudley | 73/70.1 X |
| 2,587,317 | 2/1952 | Henry | 73/99 X |
| 3,054,284 | 9/1962 | Ciringione et al. | 73/70.1 X |
| 3,292,425 | 12/1966 | Conn | 73/67 |
| 3,561,261 | 2/1971 | Conniff et al. | 73/99 |

*Primary Examiner*—Charles A. Ruehl
*Attorney*—Charles M. Fryer et al.

[57] ABSTRACT

A vibration damper test machine including a rotary mass elastic system and characterized by electromagnetic means for exciting the system in the form of an oscillating torque of resonant frequency to produce large torsional vibrations at an end of the system adapted to receive a torsional vibration damper. The electromagnetic excitation means is arranged such that an excitation frequency corresponding to a predetermined order of vibration and an excitation torque corresponding to the order of vibration amplitude can be induced into the mass elastic system to simulate conditions existing in a particular engine. An observed excessive amount of strain on the system at resonance provides an indication of malfunction of the damper.

12 Claims, 4 Drawing Figures

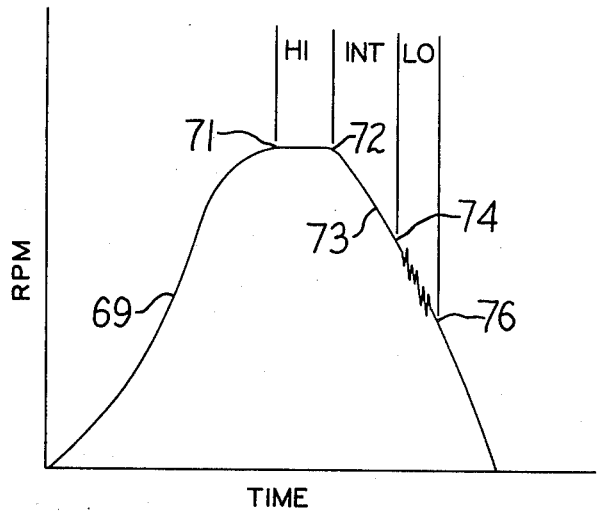
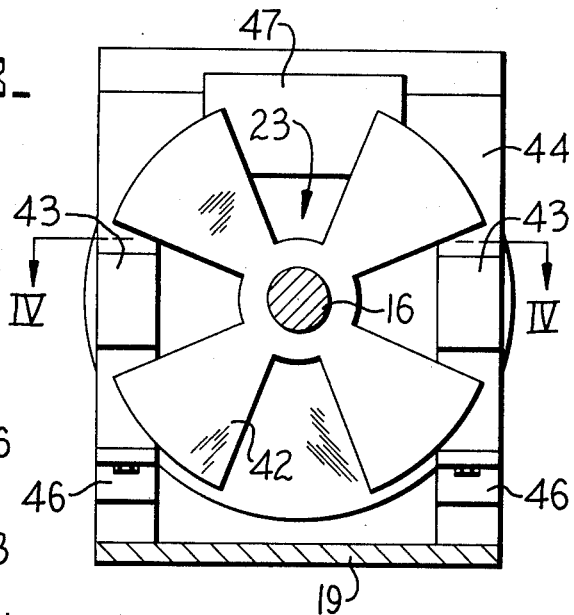
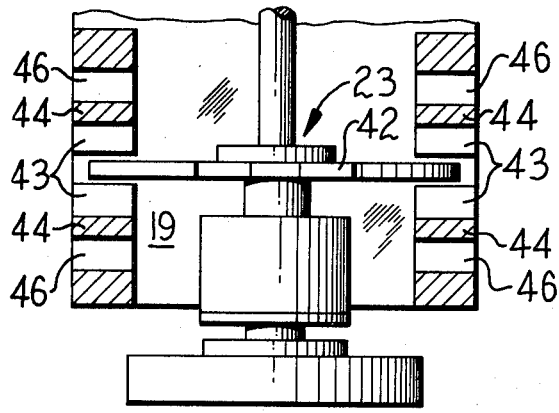

VIBRATION DAMPER TEST MACHINE

BACKGROUND OF THE INVENTION

Vibration damper test machines have long been employed to facilitate the ready determination of the quality of new torsional vibration dampers or those that have been in service on engines for some time. Existing machines are typically classified in three general categories, viz., Hookes joint, eccentric mass, and oscillating machines.

In the case of the Hookes joint machine, universal joints are utilized which are susceptible to wear and must, therefore, be replaced periodically and the machine realigned and calibrated. The eccentric mass mechanism has a series of unbalanced weights and being driven by gears, again leads to wear problems. An oscillating machine, while being able to test rubber dampers, is difficult to adapt to viscous dampers since some means must be provided to produce continuous rotation for forcing the viscous fluid to its outer diametral limits during operation.

Thus, such conventional vibration damper test machines all have disadvantages which make their use costly or difficult. Testing of dampers on engines, on the other hand, is uneconomical since different engines would be required for the various different dampers and continuous starting-stopping procedures with engines for testing each damper would be impractical on a production basis.

SUMMARY OF THE INVENTION

The present invention relates to a torsional vibration damper test machine, and is more particularly directed to such a machine wherein engine simulation and exciting forces are induced electromagnetically.

It is an object of the present invention to provide a vibration damper test machine in which vibration excitation force is applied magnetically in place of physical contact means whereby no wear occurs at the point of application of force.

Another object of the invention is the provision of a test machine of the class described wherein the order and magnitude of torsional vibration simulated may be readily changed.

Still another object of the invention is to provide a test machine of the hereinbefore described type in which a motor is used only to bring a rotary mass elastic system to speed such that drive power requirements are minimal.

It is a further object of the invention to provide a vibration damper test machine with which a wide range of dampers can be evaluated and different engines can be readily simulated by changing inertias or torsional stiffness of the rotary mass elastic system.

In the accomplishment of the foregoing and other objects and advantages, a torsional vibration damper test machine in accordance with the present invention generally comprises a rotary mass elastic system adapted at one end to receive a torsional vibration damper to be tested and coupled at the opposite end to an electric drive motor for rotating the system to a predetermined rotational speed. Electromagnetic means are associated with the system to induce vibration excitation therein having an excitation frequency and excitation torque respectively corresponding to an order of vibration and the order of vibration amplitude corresponding to a particular engine being simulated by the system.

In a preferred embodiment of the machine, the electromagnetic excitation means include a disc rotatable with the mass system and having a plurality of radially extending members of magnetically permeable material. In addition, means are provided for generating a magnetic field through which the members pass during rotation of the system whereby the field first attracts the members to apply a positive torque and then tends to retain the members to apply a negative torque to the system. In such manner torsional vibration excitation is applied to the system.

The coupling between the motor and the mass elastic system is arranged to permit decoupling of the motor from the system when the predetermined rotational speed is attained. The system then decelerates to a speed at which the torsional vibration excitation frequency is resonant with the mass elastic system and the largest amount of strain is induced therein. Means are provided to measure the strain in the system as an indication of the effectiveness of the torsional vibration damper being tested. Various elements of the elastic mass system may be interchanged to vary the inertia and torsional stiffness thereof and the vibration excitation may be varied, as by interchanging discs with different numbers of radial members, in order to simulate a wide variety of engine conditions.

BRIEF DESCRIPTION OF THE DRAWINGS

FIG. 2 is a graphical presentation of mass elastic system RPM's versus time of the machine depicting the automatic operation thereof.

FIG. 3 is a sectional view taken at line III—III of FIG. 1, illustrating particularly the electromagnetic torsional vibration excitation means of the machine.

FIG. 4 is a sectional view taken at line IV—IV of FIG. 3.

DETAILED DESCRIPTION OF THE PREFERRED EMBODIMENT OF THE INVENTION

Figure 1:
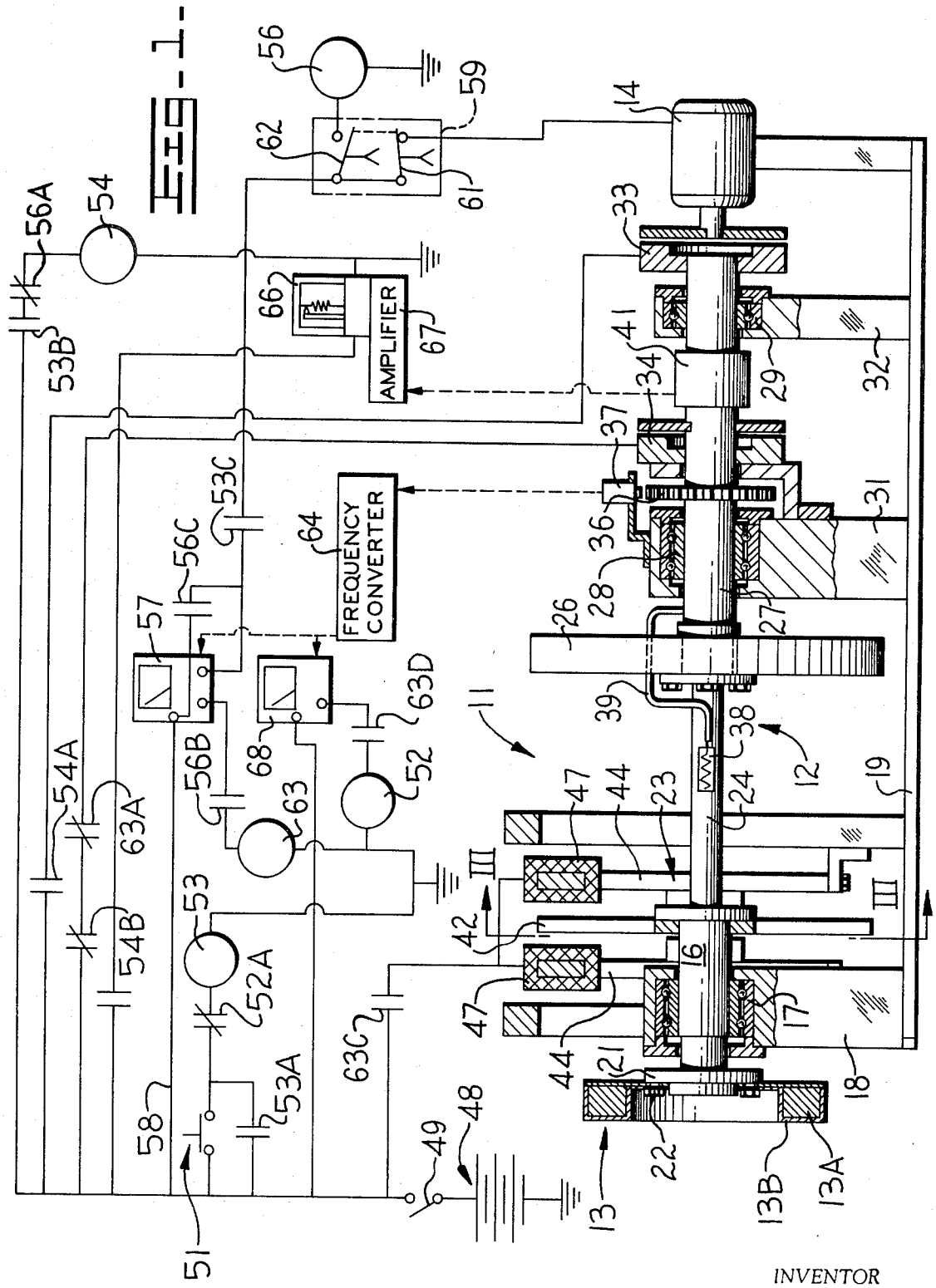
FIG. 1 is a side elevational view with portions broken away of a torsional vibration damper test machine in accordance with the present invention, an electrical control circuit for automatic operation of the machine being illustrated in schematic detail.

Referring now to the drawings in detail, FIG. 1 in particular, a torsional vibration damper test machine 11 in accordance with the present invention includes a rotary mass elastic system 12 adapted at one end for attachment to a torsional vibration damper 13 to be tested and coupled at the opposite end to an electric drive motor 14 for rotating the system to a predetermined rotational speed.

The system 12 preferably comprises a shaft 16 rotatably mounted by means of a bearing 17 carried in an upright support member 18 mounted upon a base plate 19. Shaft 16 is provided with a hub 21 at one end to facilitate securance of damper 13 as by means of bolts 22.

The other end of shaft 16 is arranged for securance of a disc 23 comprising one element of electromagnetic torsional vibration excitation means subsequently described in detail herein. Such end of the shaft 16 is also secured to a drive shaft 24 of relatively reduced diameter which is secured at its opposite end to a flywheel 26. A coaxially projecting shaft 27 associated with the flywheel is journaled by means of bearings 28 and 29 carried by longitudinally spaced upright support members 31 and 32 mounted upon the base plate 19.

The free end of shaft 27 is coupled by means of an electromagnetic clutch 33, such as manufactured by Warner Electric Brake and Clutch Co., to the motor 14. In addition, an electromagnetic brake 34, for example of a type commercially available from the same manufacture, is associated with the shaft 27 to selectively apply braking torque thereto. The shaft 27 further carries a peripherally slotted disc 36 of magnetic material, and a magnetic pick up 37 is carried by the support member 31 adjacent the disc to generate an electrical signal representative of the rotational speed of the shaft 27, and thus of the entire mass elastic system 12.

A strain gauge 38 secured to drive shaft 24 is electrically connected through an insulated conductor 39 to the primary side of a rotary transformer 41 coupled to shaft 27. An electrical signal generated at the secondary side of transformer 41 is thus indicative of the strain placed on drive shaft 24. Rotary transformer 41 may, for example, be a commercially available Himmelstein MCRT 4-04.

Considering now the electromagnetic torsional vibration excitation means including disc 23 in more detail, it is to be noted, with particular reference to FIG. 3, that such disc includes a plurality of radially extending members 42 of magnetically permeable material. The excitation means further includes means for generating a magnetic field transverse to the extending members during disc rotation. The magnetic field generating means preferably comprise pairs of pole piece shoes 43 disposed on opposite sides of the extending members 42 of the disc 23 and secured to U-shaped magnetic yokes 44. The yokes are secured to the base plate 19 and insulated therefrom by nonmagnetic spacers 46.

Coils 47 are wound about the webs of yokes 44 to form an electromagnetic circuit which, upon electrical energization of the coils generates a magnetic field between the shoes transverse to the disc extending members. Since the members are permeable, as they approach an opposed pair of shoes during disc rotation they are attracted by the magnetic field generated between the shoes such that a positive torque is applied to the shaft 24. As the extending members are rotated past the magnetic field, magnetic forces tend to retain the members and apply a negative torque to the shaft 24. The combination of positive and negative torques thus create a vibration frequency imparted to the shaft 24 and thus the entire mass elastic system 12. Because the excitation frequency is dependent upon the extending members 42 passing through the magnetic field during disc rotation, such frequency varies in accordance with the rotational speed of the system.

In the general operation of the test machine 11, the drive motor 14 rotates the mass elastic system 12 to a predetermined rotational speed at which time the clutch 33 is disengaged to decouple the motor from the system. The electromagnetic excitation system is simultaneously energized to impart torsional vibration to the system at a frequency dependent upon the rotational speed thereof.

As the system decelerates, a resonant condition is established at some speed between the induced excitation frequency and the combination of shaft 24 and flywheel 26. The strain placed on shaft 24 at resonance is a maximum, and strain gauge 38 generates an electrical signal representative of the strain which is derivable from the secondary side of rotary transformer 41. Readings of the strain signal at resonance thus provide an indication of the effectiveness of the damper 13. After the maximum strain readings are obtained, the brake 34 may be applied to terminate rotation of the system 12.

In order that the operation of the test machine 11 may be conducted automatically, an electrical control circuit is preferably associated therewith as depicted in FIG. 1. More particularly, the circuit includes a power supply 48 connected between ground and an on-off switch 49 in turn connected through a start cycle switch 51, normally closed contacts 52A of relay 52, and a relay 53 to ground. Normally open contacts 53A of relay 53 are connected in parallel with switch 51.

Switch 49 is also connected via normally open contacts 54A of relay 54 to the energizing input of electromagnetic clutch 33. Relay 54 is coupled between switch 49 and ground by means of normally open contacts 53B of relay 53 and normally closed contacts 56A of a relay 56.

An instrument controller 57 is connected to switch 49 by means of a conductor 58, and one output terminal of the controller is coupled via normally open contacts 53C to a motor timer 59. Normally closed contacts 61 of the timer are connected in energizing relation to the motor 14, and relay 56 is connected between normally open contacts 62 of the timer and ground.

A second output terminal of the controller is coupled through normally open contacts 56B of relay 56 to a relay 63 in turn connected to ground. The input terminal of the controller is bridged to the first output terminal thereof by means of normally open contacts 56C of relay 56.

The magnetic pick up 37 is connected to a frequency converter 64 which applies a signal proportional to the rotational speed of the mass elastic system 12 to a speed input of the controller 57. The controller 57 and timer 59 are so arranged that at a predetermined speed sensed by the pick up 37 and converter 64, the timer is actuated to initiate a brief time delay after which contacts 61 are opened and contacts 62 closed. Current flows between the input terminal and first output terminal of the controller until the sensed speed of the mass elastic system decreases to a second predetermined value. At this second predetermined reduced speed, current flow between the input terminal and first output terminal of the controller is terminated and current flow between the input terminal and second output terminal established.

Switch 49 is connected via normally closed contacts 54B of relay 54 and normally closed contacts 63A of relay 63 to the energizing input of electromagnetic brake 34. Switch 49 is coupled by means of normally open contacts 63B of relay 63 to the actuating input of a recording oscillograph 66.

The secondary of rotary transformer 41 is coupled by amplifier 67 to the signal input of the oscillograph to facilitate recording of the strain signal sensed by strain gauge 38 upon actuation of the oscillograph. Switch 49 is further coupled via normally open contacts 63C of relay 63 to the coils 47 of the electromagnetic torsional vibration excitation means.

The input terminal of a second instrument controller 68 is connected to switch 49, and an output terminal of such controller is coupled by means of normally open contacts 63D of relay 63 to relay 52 which is in turn connected to ground.

The speed signal at the output of converter 64 is connected to a speed input of controller 68. Controller 68 is arranged such that current flow is established between the input and output terminals thereof when the sensed speed of the mass elastic system 12 decreases to a third predetermined relatively low value.

It should be noted that the controllers 57 and 68 are of commercially available types, for example API instrument controllers. The timer 59 is likewise commercially available, for example an Automatic Timing and Control No. 325A–346A1 OPL.

Considering now the automatic operation of the test machine 11 by means of the control circuit just described, a test cycle is initiated by closing switch 49 and depressing start cycle switch 51. Brake 34 is energized through normally closed contacts 54B and 63A such that the brake is initially applied to prevent rotation of the mass elastic system 12.

However, depression of switch 51 effects energization of relay 53, thereby closing contacts 53A, 53B and 53C. Contacts 53A lock out the switch 51 and contacts 53B effect energization of relay 54. Contacts 53C provide energization of motor 14 through controller 57 and contacts 61 of timer 59.

Energization of relay 54 causes contacts 54A to close, thereby energizing clutch 33 to engage same, and contacts 54B to open, thereby releasing brake 34. Thus at this time the motor is energized, the clutch engaged, and the brake released such that the mass elastic system 12 is rotated to high speed as indicated by portion 69 of the curve depicted in FIG. 2. In addition, normally open contacts 63B and 63C prevent actuation of oscillograph 66 and energization of coils 47.

When the rotational speed of system 12 reaches a first predetermined value, as indicated at 71, controller 57 actuates timer 59 to initiate a predetermined time delay sufficient to allow stabilization of damper 13. At the end of the time delay, as indicated at 72, the timer contacts 61 and 62 respectively open and close to de-energize motor 14 and energize relay 56.

Relay contacts 56A open to de-energize relay 54 and contacts 56B close to establish a circuit between the second output terminal of controller 57 and relay 63. Contacts 56C close to lock out controller 57 in the circuit path to timer 59. De-energization of relay 54 opens contacts 54A to thereby disengage clutch 33 and closes contacts 54B to thereby apply the brake 34. The mass elastic system 12 consequently decelerates as indicated by portion 73 of the curve.

At a second predetermined reduced speed, as indicated at 74, controller 57 closes a circuit between its input terminal and second output terminal, thereby energizing relay 63 through the already closed contacts 56B. As a result, contacts 63A are opened to release brake 34, contacts 63B are closed to actuate oscillograph 66 to record the strain signal sensed by strain gauge 38, and contacts 63C are closed to energize coils 47 and thereby electromagnetically apply torsional vibration excitation to the mass elastic system 12.

As the system further decelerates, resonance occurs productive of maximum strain on the shaft 24, and such strain is recorded by the oscillograph 66.

At a third further reduced predetermined speed, as indicated at 76, controller 68 closes a circuit between its input and output terminals to energize relay 52 through the already closed contacts 63D. Contacts 52A responsively open to thereby de-energize relay 53 to open contacts 53A, 53B and 53C. This de-energizes the automatic cycle, relay 56, and motor circuits. De-energizing relay 56 opens contacts 56B, de-energizing relay 63 to place brake 34 in the brake condition and shutting off oscillograph 66 and the excitation magnet coils 47. Contacts 63D now being open, effect de-energization of relay 52 and the test is complete.

Considering now a specific example of the use of the test machine 11, the mass elastic system 12 is set up to correspond to a particular type engine, for example, a certain 5.4 bore, 6 cylinder engine which has been found to have its vibration amplitudes maintained at a desirable level inside a viscous vibration damper 13 having a weight 13A with an inertia $I_1$ of 1.61 pound inch second$^2$ and a viscous fluid having an effective damping and spring of 1,000 pound inch second and 1,000,000 pound inch, respectively.

To test this damper the test machine duplicates the engine by provision of a flywheel 26 having an inertia $I_3$ of 50 pound inch second$^2$ and a shaft 24 with a torsional stiffness of 6,000,000 pound inch. The remainder of the mass elastic system for engine duplication is provided by the combined inertia $I_2$ of the damper case 13B, hub 21, and disc 23, which is 8 pound inch second$^2$. An order of vibration and an excitation torque corresponding to the order of vibration amplitude of the engine, is achieved by appropriate selection of the number of extending members 42 of disc 23 and the magnitude of exciting current applied to the coils 47 of the electromagnetic torsional vibration excitation means.

An automatic cycle of testing operation is then conducted in the manner hereinbefore described and the resulting recording of oscillograph 66 observed. If the recording indicates an amplitude of 0.08° at a frequency of 135 cycles per second or less, the damper 13 is operative. If the amplitude is greater, a locked condition is indicated and the damper is determined to be malfunctioning.

It will be appreciated that a variety of engine conditions may be simulated with the test machine 11 to accommodate a number of different dampers by interchanging flywheels 26 of different inertias, shafts 24 of different torsional stiffness, vibration excitation discs 23 with varied numbers of extending members 42, and the like.

Although the invention has been hereinbefore described and illustrated in the accompanying drawings with particular reference to a single preferred embodiment it will be appreciated that numerous modifications and changes may be made therein without departing from the true spirit and scope of the invention, and thus it is not intended to limit the invention except by the terms of the appended claims.

What is claimed is:

1. A torsional vibration damper test machine comprising a rotary mass elastic system adapted at one end to receive a torsional vibration damper to be tested, an electric drive motor coupled to the opposite end of said system for rotating same to a predetermined rotational speed and thereafter permitting said system to decelerate from said predetermined speed, electromagnetic means coupled to said system for inducing vibration excitation therein during deceleration thereof, said excitation having a predetermined frequency and amplitude resonant with said system at a given speed less than said predetermined speed to thereby induce maximum strain in said system, and means for measuring said maximum strain as an indication of the effectiveness of said damper.

2. A test machine according to claim 1, further defined by said electromagnetic means comprising a plurality of members of magnetically permeable material extending radially from said system for rotation therewith, and means for generating a magnetic field transversely through said members during rotation thereof, whereby said field attracts said members to apply a positive torque and then tends to retain said members to apply a negative torque to said system.

3. A test machine according to claim 2, further defined by said members being arms of a disc coaxially secured to said system, and means for generating a magnetic field comprising a pair of magnetic yokes disposed on transversely opposite sides of said disc, pairs of pole piece shoes secured to said yokes on transversely opposite sides of the rotary path of said members, a pair of coils magnetically coupled to said yokes, and means for electrically energizing said coils.

4. A test machine according to claim 1, further defined by a clutch for selectively coupling said motor to said system, and a brake for selectively braking said system to decelerate same.

5. A test machine according to claim 4, further defined by automatic control means for energizing said motor, engaging said clutch, and releasing said brake responsive to a start signal; de-energizing said motor, disengaging said clutch, and applying said brake responsive to said first predetermined speed; releasing said brake and actuating said electro-magnetic means responsive to a second predetermined speed less than said first predetermined speed, and applying said brake and deactuating said electromagnetic means responsive to a third predetermined speed less than said second predetermined speed.

6. A test machine according to claim 1, further defined by said mass elastic system comprising a shaft having a hub at one end for securance to said damper, means journaling said shaft for rotation, a flywheel having a second shaft projecting coaxially therefrom, means journaling said second shaft for rotation, said motor coupled to said second shaft, and a third shaft of reduced diameter relative to said first shaft coaxially secured between the second end of said first shaft and said flywheel, the strain measuring means including a strain gauge secured to said third shaft, and means for indicating the current from said strain gauge.

7. A test machine according to claim 6, further defined by the electromagnetic means comprising a disc coaxially secured to said second end of said first shaft, said disc having a plurality of radially extending members of magnetically permeable material, and means for generating a magnetic field transversely of the rotational path of said members, whereby said field alternately attracts said members to apply positive torque to said first shaft and tends to retain said members to apply negative torque to said first shaft.

8. A test machine according to claim 7, further defined by the field generating means comprising a pair of U-shaped magnetic yokes disposed on transversely opposite sides of said disc, pairs of pole piece shoes secured to said yokes on transversely opposite sides of the rotational path of said members, a pair of coils magnetically coupled to said yokes, and means for selectively energizing said coils.

9. A test machine according to claim 6, further defined by an electromagnetic clutch coupling said motor to said second shaft, an electromagnetic brake coupled to said second shaft, and rotational speed sensing means associated with said second shaft for producing a signal indicative of the speed thereof.

10. A test machine according to claim 9, further defined by the electromagnetic means comprising a disc coaxially secured to said second end of said first shaft, said disc having a plurality of radially extending members of magnetically permeable material, and electromagnet means including electrically energizable coils for generating a magnetic field transversely of the rotational path of said members responsive to energization of said coils.

11. A test machine according to claim 10, further defined by said clutch being engaged responsive to electrical energization and disengaged responsive to de-energization, said brake being applied responsive to electrical energization and released responsive to de-energization, and automatic control circuit means responsively coupled to said speed sensing means and coupled in energizing relation to said motor, clutch, brake, coils, and strain gauge current indicating means, said control circuit means being arranged to energize said motor and clutch and de-energize said brake in response to a start signal, de-energize said motor and clutch and energize said brake in response to the speed signal from said speed sensing means representing said first predetermined speed, de-energize said brake and energize said coils and strain gauge current indicating means in response to said speed signal representing a second predetermined speed less than said first predetermined speed, and energize said brake and de-energize said coils and strain gauge current indicating means in response to said speed signal representing a third predetermined speed less than said second predetermined speed.

12. A test machine according to claim 11, further defined by said control circuit means comprising a controller having an energization input terminal, first and second output terminals, and a speed signal input terminal, said speed signal input terminal coupled in receiving relation to said speed sensing means, said controller arranged to open a circuit between said energization input terminal and first output terminal and close a circuit between said energization input terminal and second output signal in response to said second predetermined speed, a timer having normally open contacts and normally closed contacts, said controller arranged to initiate a predetermined time delay in said timer in response to said first predetermined speed, said timer arranged to open said normally closed contacts and close said normally open contacts thereof responsive to termination of said time delay, a power supply, a relay having first, second and third normally open contacts, a second relay having normally open contacts and normally closed contacts, a third relay having first and second normally open contacts and normally closed, contacts, a fourth relay having first, second and third normally open contacts and normally closed contacts, a fifth relay having normally closed contacts, a depressible cycle start switch, and a second controller having an energization input terminal, an output terminal, and a speed signal input terminal coupled in receiving relation to said speed sensing means, said second controller arranged to close a circuit between said energization input and output terminals thereof responsive to said third predetermined speed, said start switch, normally closed contacts of said fifth relay, and said first relay series connected between said supply and ground, said supply connected to said input terminals of said first and second controllers, said first normally open contacts of said first relay connected in parallel with said start switch, said second normally open contacts of said first relay and normally closed contacts of said third relay series connecting said second relay between said supply and ground, said normally open contacts of said second relay connecting said supply to said clutch, said normally closed contacts of said second relay and normally closed contacts of said fourth relay series connecting said supply to said brake, said first normally open contacts of said fourth relay connecting said supply to said strain gauge current indicating means, said second normally open contacts of said fourth relay connecting said supply to said coils, said third normally open contacts of said fourth relay connecting said fifth relay between ground and said output terminal of said second controller, said third normally open contacts of said first relay connecting said first output terminal of said first controller to said normally open and normally closed contacts of said timer, said normally closed contacts of said timer connected to said motor, said third relay connected between said normally open contacts of said timer and ground, said first normally open contacts of said third relay connected between said input terminal and first output terminal of said first controller, said second normally open contacts of said third relay and said fourth relay series connected between said second output terminal of said first controller and ground.

* * * * *